United States Patent [19]

Jong et al.

[11] 4,023,874

[45] May 17, 1977

[54] OXYGEN MASK STOWAGE

[75] Inventors: Howard W. Jong, Monterey Park; Maurice F. McDonell, Long Beach, both of Calif.

[73] Assignee: McDonnell Douglas Corporation, Long Beach, Calif.

[22] Filed: Feb. 23, 1976

[21] Appl. No.: 660,660

[52] U.S. Cl. .............................. 312/291; 244/118 P
[51] Int. Cl.² ................. B64C 1/14; B60N 11/00
[58] Field of Search .......... 297/291, 294, 391, 237, 297/270, 271; 312/291–293; 128/142.2, 203, 204; 244/118 P; 291/144, 201

[56] References Cited

UNITED STATES PATENTS

| 2,606,052 | 8/1952 | Soreng et al. | 292/144 |
| 3,073,301 | 1/1963 | Hoy | 128/203 |
| 3,321,226 | 5/1967 | De Claire et al. | 292/201 |
| 3,330,506 | 1/1967 | Robillard et al. | 244/118 P |
| 3,536,070 | 10/1970 | Bovard | 128/203 |
| 3,752,324 | 8/1973 | Moser | 312/291 |

Primary Examiner—Casmir A. Nunberg
Attorney, Agent, or Firm—John P. Scholl; Walter J. Jason; Donald L. Royer

[57] ABSTRACT

An automatically releasable restraining device for use in an oxygen system storage compartment to hold an oxygen mask, breather bag and associated tubing. The device facilitates inspection, closing of the compartment door, and proper release and positioning of the oxygen system equipment for use.

4 Claims, 4 Drawing Figures

U.S. Patent    May 17, 1977    4,023,874
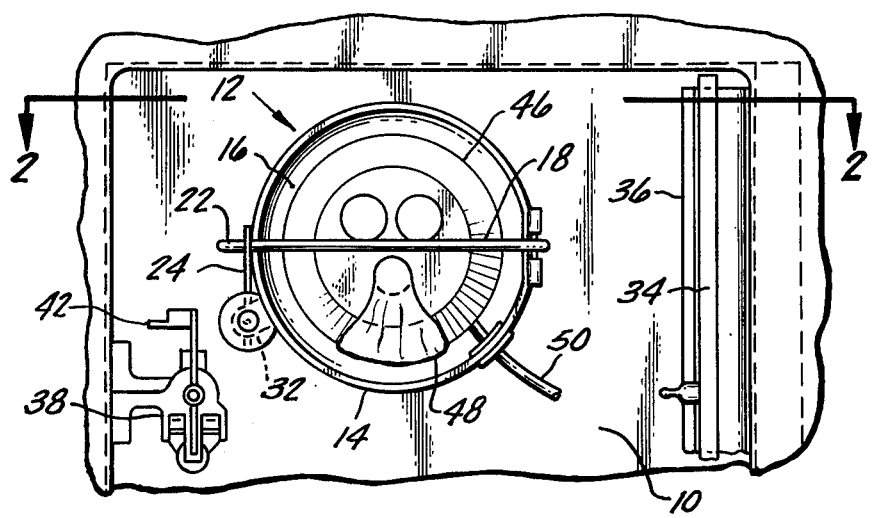
FIG-1
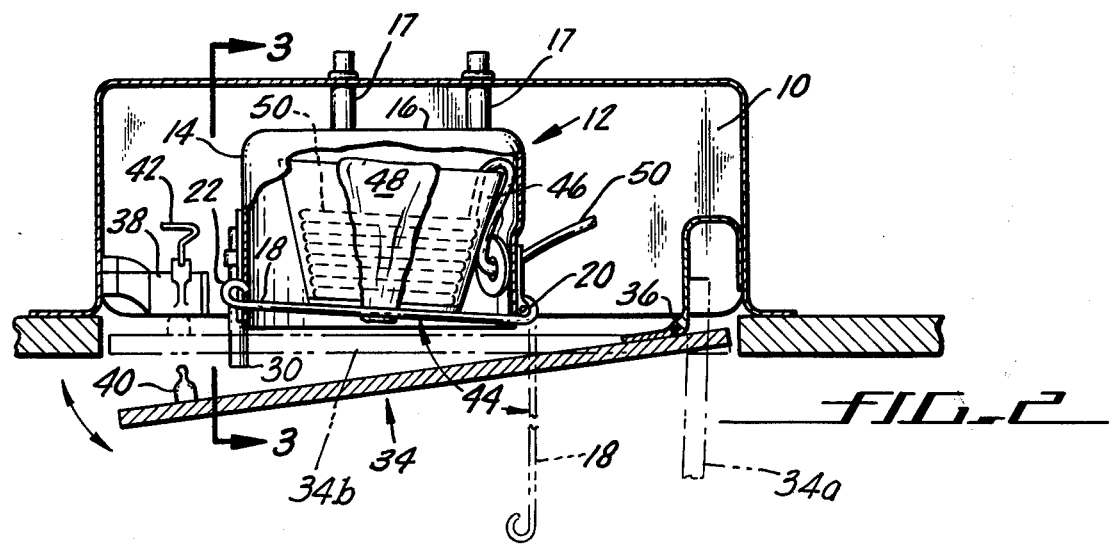
FIG-2
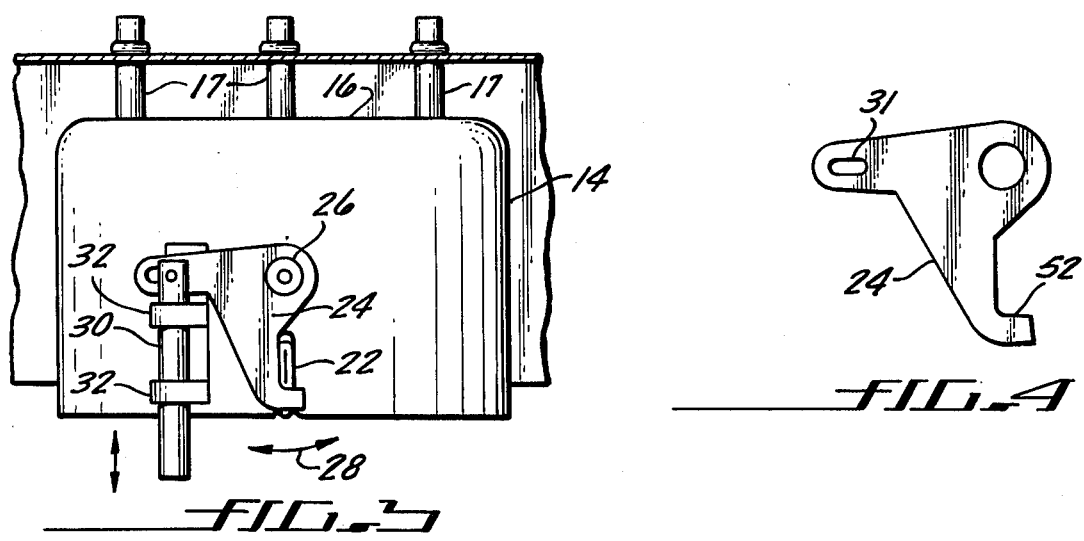
FIG-3
FIG-4

OXYGEN MASK STOWAGE

BACKGROUND OF THE PRESENT INVENTION

In modern passenger aircraft, oxygen supply equipment is normally stored in compartments in back of aircraft seats or overhead of the passenger in the ceiling of the fuselage of the aircraft. The deployment of the equipment is usually by an electrical impulse to a fastener which releases the oxygen supply equipment storage compartment door. In an alternative arrangement, the actuator is energized by an aneroid which reacts to air pressure less than 10,000 mean sea level. In either instance the oxygen supply equipment storage compartment door opens as a result of gravity or spring pressure and the oxygen supply equipment falls into position for use.

The oxygen supply equipment, including oxygen masks, reservoir bags, tubing and oxygen generators require periodic operational checkout and inspections. In the past, the masks, reservoir bags and tubing have not been restrained in the storage compartment and the repacking and closing of the compartments has been difficult as the masks, bags and tubing tend to bunch together and become entangled in the compartment openings or with the compartment door hinge and lock mechanism.

SUMMARY OF THE PRESENT INVENTION

The purpose of the present invention is to provide an automatic releasable restraining apparatus for positioning oxygen supply equipment in a storage compartment while said storage compartment is being inspected and which equipment will be released upon the opening of the oxygen compartment door.

The present invention is accomplished by providing an oxygen mask cannister, restraining bar and triplatch. The triplatch is activated by the closing of the oxygen supply equipment compartment door so that when the compartment door is subsequently opened the oxygen supply equipment will fall free into position for use.

BRIEF DESCRIPTION OF THE DRAWINGS

FIG. 1 is a bottom view of an overhead oxygen supply equipment storage compartment with oxygen mask, reservoir bag, and tubing in the stored and restrained position;

FIG. 2 is a vertical sectional view of the oxygen supply equipment compartment of FIG. 1 taken along the section 2—2 with the storage compartment door in the partially closed position and triplatch in lock position and latch bar bridging the bottom of the cannister in the restraining position. The oxygen cannister has been cut away to show the positioning of the oxygen mask, breather bag and tubing in the restrained position. The storage compartment door is also shown phantomed in the closed and open positions;

FIG. 3 is a vertical sectional view of the oxygen equipment cannister and triplatch mechanism taken along the section line 3—3 of FIG. 2; and FIG. 4 is an enlarged vertical view of the triplatch mechanism shown in FIG. 3.

DETAILED DESCRIPTION OF ILLUSTRATIVE EMBODIMENT

In FIG. 1 and FIG. 2 an oxygen supply equipment storage compartment 10 is shown. This compartment may be located in the ceiling of: (a) the passenger compartment, (b) the lounge area, (c) the galley area, (d) the lavatory area, or (e) in the crew working areas. Located in the storage compartment 10 is an oxygen breathing system restraining device 12. The storage compartment 10 may contain one or more restraining devices 12 depending upon the number of oxygen breathing systems needed in a particular location. The storage compartment may also contain an oxygen generator and other related equipment (not shown).

The restraining device 12 includes a cannister 14 which may be in cylindrical form with the upper end enclosed by a plate 16. The cannister 14 is attached to the compartment 10 by rivet-type spacers 17 (FIGS. 2 and 3) which hold plate 16 relative to compartment 10. The cannister has a restraining bar 18 which is attached at one side of the bottom of the cannister 14 by hinge 20. The opposite end 22 of the bar 18 is releasably held in a position bridging the open end of said cannister by triplatch 24.

The latch is rotatably mounted on the side of the cannister 14 by an expansion rivet 26. In FIG. 3 the rotational movement of latch 24 around rivet 26 is shown by arrow 28. The latch 24 is rotated by an actuator pin 30. A slot 31 located in latch 24 (FIG. 4) permits the vertical movement of actuator pin 30 to be translated to rotational movement of latch 24. Pin 30 is held in vertical alignment adjacent to cannister 14 by guides 32. Guides 32 may be affixed to cannister by riveting or welding.

The storage compartment is enclosed by a door 34 (FIG. 2). The door is rotatably attached at one end to the edge of the compartment by compartment door hinge 36. The opposite end of the compartment door 34 may be held in the closed position by an electrically operable fastener 38. Affixed to the door 34 is a bolt 40 which engages the fastener 38. The fastener has a manual release lever 42 which permits the bolt 40 to disengage the fastener 38.

The compartment door 34 may be spring loaded to the open position or in the alternative may fall by the action of gravity to the open position.

In the open position the door 34a is shown in part in phantom outline. The entire outline of the door 34b is phantomed in the closed position.

In the normal maintenance of aircraft, periodic inspections are required of the oxygen supply apparatus and related equipment. The oxygen supply apparatus consists of a face mask 46, breather bag 48 and tubing 50. In FIG. 1 oxygen is introduced into the apparatus through tubing 50 from a central aircraft oxygen supply (not shown) or from individual oxygen generators (not shown) located throughout the aircraft.

To open the oxygen compartment storage door 34, the inspector inserts a screwdriver or other probing instrument through a small aperture (not shown) in the door 34 and trips the release lever 42 which operates the fastener to release the bolt 40 and permits the door to swing to the open position. As the door swings open restraining bar 18 (already released) likewise moves in counterclockwise direction of arrow 44 to the open position (phantomed) in FIG. 2. The moving of restraining bar 18 to the open position permits the oxygen mask 46, breather bag 48 and tubing 50 to fall into position for use.

At this point the inspector can examine the various oxygen supply apparatus for deterioration or wear and repairs can be made as required.

When inspection has been completed, the inspector repacks the oxygen equipment by coiling the tubing and placing it, with the folded oxygen breather bag 48 partially inside the face mask 46. The mask 46 is then placed inside the cannister 14 and the restraining bar 18 is brought into a bridging position to span the bottom opening of the cannister to hold the mask in the stored position as shown in FIGS. 1 and 2. The inspector then rotates latch 24 counterclockwise as shown by double ended arrow 28 so that the hook 52 on latch 24 engages the end 22 of bar 18, (FIG. 3).

The mask 46 and related oxygen supply equipment are held in the stored position by the restraining bar 18. Once all of the equipment in the compartment 10 has been inspected, storage compartment door 34 is rotated clockwise about hinge 36 as shown by the double ended arrow 44 toward the closed position.

When the door 34 has almost closed (FIG. 2) it engages the bottom of actuator pin 30 which rotates latch 24 clockwise (FIG. 3) and releases the end 22 of bar 18 which then rests upon the inside of door 34. The door 34 is then completely closed and held closed by bolt 40 engaging fastener 38.

When the door fastener 38 is actuated either electrically or manually, the door 34 swings open. Since bar 18 is no longer held by latch 24 it is free to swing to the open position as shown in FIG. 2 and the oxygen face mask 46, breather bag 48 and tubing 50 fall free of the restraining device 12 into position for use.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, since various other modifications may occur to persons having ordinary skill in the art and it is to be understood that those modifications are to be construed as part of the present invention.

What is claimed is:

1. An oxygen system restraining device for use in an oxygen storage equipment compartment with a rotating door comprising:
   a cannister attached to said compartment, said cannister open at the bottom;
   releasable bridging means to span the open bottom of said cannister;
   a latch to hold said bridging means in position spanning the open bottom of said cannister;
   actuator means responsive to closing of said compartment door to release said latch.

2. The restraining device of claim 1 wherein the actuator means is a pin which engages said door on closing and opens said latch.

3. The restraining device of claim 2 wherein said pin is attached to said latch and rotates said latch to the release position.

4. An oxygen system restraining device for use in an oxygen storage equipment compartment with a rotating door comprising:
   a cylindrical cannister attached to the top of said compartment, said cannister being open on the bottom;
   a vertically rotatable bar mounted on bottom edge of said cannister to bridge the open bottom of said cannister;
   a rotatable latch attached to the opposite edge of the cannister as said bar, to hold said bar and restrain it in position to bridge said open bottom of said cannister; and
   an actuator pin attached to said latch to engage the compartment door on closing to open said latch.

* * * * *